J. R. CONRAD.
EXPANSION BOLT.
APPLICATION FILED APR. 19, 1911.
1,121,980.
Patented Dec. 22, 1914.
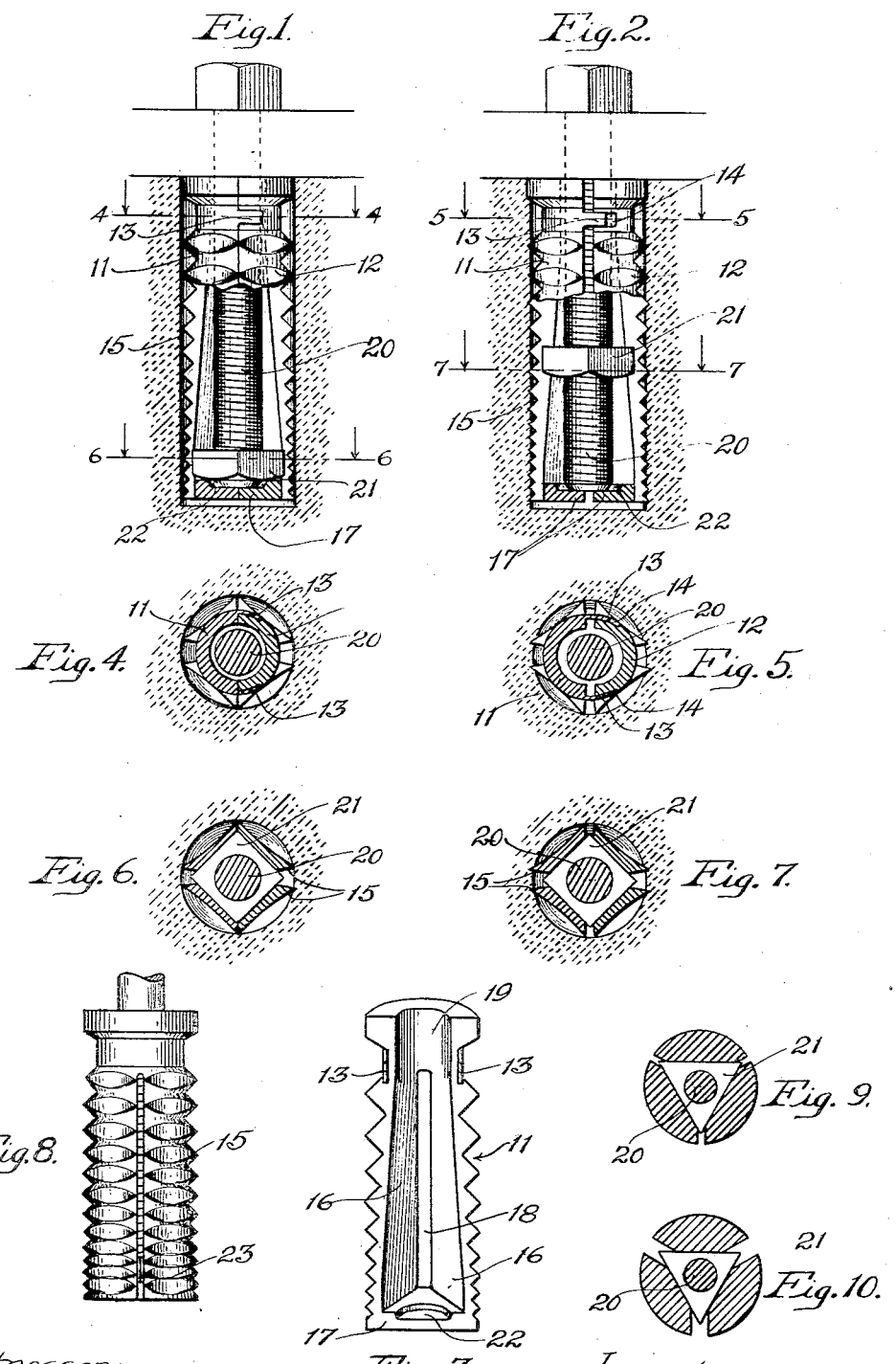
Witnesses:
Ephraim Banning
Thomas A. Banning
Inventor:
Joseph R. Conrad
By Banning & Banning
Attorneys

UNITED STATES PATENT OFFICE.

JOSEPH R. CONRAD, OF CHICAGO, ILLINOIS, ASSIGNOR, BY MESNE ASSIGNMENTS, TO
U. S. EXPANSION BOLT CO., OF NEW YORK, N. Y., A CORPORATION OF NEW YORK.

EXPANSION-BOLT.

1,121,980.        Specification of Letters Patent.     Patented Dec. 22, 1914.

Application filed April 19, 1911. Serial No. 622,109.

*To all whom it may concern:*

Be it known that I, JOSEPH R. CONRAD, a citizen of the United States, residing at Chicago, in the county of Cook and State of Illinois, have invented certain new and useful Improvements in Expansion-Bolts, of which the following is a specification.

My invention relates to locking devices for the attachments of fixtures to walls, and in particular to an improved form of expansion bolt designed for such use.

The objects of my invention are, to provide an expansion bolt combining the greatest locking strength with the least material; to provide an expansion bolt of such construction as will not break or give when subjected to intense pressure; to provide an expansion bolt in which an ordinary form of square nut and bolt may be used; to provide an expansion bolt of such construction that the pressure exerted by the nut as it is advanced within the shell will be exerted uniformly on every side, tending thus to distribute the strain equally; to provide an expansion bolt so formed that the bearing surfaces against which the nut exerts pressure will serve as guiding surfaces to prevent rotation; and to provide an expansion bolt in two sections, having means thereon to lock them together readily for insertion into the wall, and to unlock when the expanding force is applied.

Further objects of my invention consist in the features of construction and combination of parts as hereinafter described and set forth.

Referring to the drawing, Figure 1 is a longitudinal section of my expansion bolt as it appears ready to be locked in the wall; Fig. 2 is a view similar to Fig. 1, showing the expansion bolt in locked position; Fig. 3 is a perspective view of one of the shells constituting the expansion bolt; Fig. 4 is a cross section taken on line 4—4 of Fig. 1, looking in the direction of the arrows; Fig. 5 is a cross section taken on line 5—5 of Fig. 2, looking in the direction of the arrows; Fig. 6 is a cross section taken on line 6—6 of Fig. 1, looking in the direction of the arrows; Fig. 7 is a cross section taken on line 7—7 of Fig. 2, looking in the direction of the arrows; Fig. 8 is an elevation of a modified form of my expansion bolt; and Figs. 9 and 10 are cross sections of this modified form of construction, showing respectively the normal and expanded positions assumed.

The expansion bolt of the present invention comprises a pair of symmetrical shells 11 and 12, the former being provided with a pair of lugs 13, adapted to overlie and engage in depressions 14 formed in the other of said shells. It is not intended that the said lugs shall engage in the depressions when the shells are placed in assembled position, but that they may be made to lock in the said depressions when bent inwardly with a hammer or other similar instrument. This construction affords locking means easy to apply, permitting ready insertion of the expansion bolt into the wall. Each of said shells has its exterior surface raised to provide a number of knurled projections 15, which, in respect to their height upon the surface of the shells, are in alinement, in order to make an even contact against the sides of the hole in which the expansion bolt is to be secured. As best illustrated in Fig. 3, the interior of each of said shells is formed with two flat tapering surfaces 16, at right angles to each other, terminated at the inner end of the shell by the wall 17, divided along their intersection by a slot 18, and united at the outer end to form a semi-circular neck 19.

A bolt 20, of ordinary type, provided with a square nut 21, is placed between the shells at the time they are assembled, the square nut 21 lying at the inner end of the shells. The said nut is of proper size to fit in the inner end of the said shells when in locked position. The end of the bolt is made to bear against the wall 17 and may turn in a depression 22 formed therein. As the bolt is turned in the proper direction, the nut thereon is advanced within the shells, it being prevented from rotation by the engagement of the tapering surfaces with its own sides. Since the surfaces 16 are tapered toward the outer end, and are constantly engaged by the sides of the nut, it is apparent that the advance of the nut will cause the shells to be spread apart, and to be locked within the hole in the wall. The lugs 13, which are bent inwardly to engage the depressions 14, at the moment the shells begin to spread apart, are bent outwardly again, their locking action being released until they retain no hold whatever upon the shell 12. Without this easy release, it is obvious that the shells would bear against the side of the hole, in which it is desired they should be held, only at one end, and that, as the nut advances, the strain against the sides of the shells by the nut would be increased to a dangerous degree.

It is of special importance to note the action of the square nut upon the four tapering surfaces within the shells. As far as I am able to learn, it has heretofore been customary to construct expansion bolts having the expanding member apply the spreading forces only in opposite direction, or, if applied radially, to supply special means for preventing rotation of the said expanding member within the shells. When, as in the case of an hexagonal nut, two of its sides are made to bear against the interior tapering surfaces of the shells and the remaining four sides serve merely to travel along the four guiding surfaces to prevent rotation of the nut, there is an undue strain exerted upon the nut that will occasionally cause it to split. There is also an uneven application of the expanding force against the shells, as two of its interior opposite surfaces only receive such forces, whereas the result sought to be attained would call for forces radially applied. In the case of the expansion bolt employing an expander which applies the forces radially, it is necessary, as far as I know, to provide means to hold said expander against rotation. This is usually done by supplying a couple of lugs on the expander, which travel either in channels provided for that purpose or against guide members formed within the shells. In any case, as the shells are spread apart, the expander does not usually bear against the surfaces of the shells at every point on its periphery as it is advanced, but only in certain places. Obviously, the maximum efficiency is not attained. In the expansion bolt of my construction, there is provided an expander, the square nut, which exerts radially the expanded forces at all times; and the same surfaces against which the nut is made to bear serve also to guide the nut in its advance to prevent its rotation within the shells.

The corners of the nut may extend slightly into the slots formed at the intersections of the tapering surfaces. It is also desirable to form the slot for two reasons: In the first place, should the corner formed by the intersection of the tapering surfaces be slightly rounded and not clean-cut, the corner of the nut bearing thereagainst, would tend to split said shell; and in the second place, the four segments on said shell against which the sides of the nut exert their pressure, which are formed by the position of the slots, can be outwardly bent to a slight degree as the nut is advanced. This tendency to a slight bending will always be present, and I desire in the construction of my expansion bolt to take advantage of it to secure a firmer locking action.

It is designed, in forming the knurled points on the exterior surface of the shells, to provide a better surface for locking the expansion bolt in the wall. In Fig. 2 it is shown how such points act when the shells are expanded, the points being forced into the wall to bite thereagainst. Their sharp contour is also designed to prevent the shells by friction from rotation or outward movement while they are being locked in the wall. Obviously, for the attachments of fixtures to a wall, the employment of projections such as are described will be of material advantage.

The form of construction shown in Figs. 8, 9 and 10 is an adaptation of a three-sided nut to expand a shell. In this form of construction there is but one shell employed. Three slots 23 extend from the inner end along the greater portion of its length and terminate sufficiently far from the outer end to permit of a webbed end formation. The three interior surfaces are inclined exactly as in the preferred form already described; the bearing surfaces serve to guide the nut; and the expanding action is substantially the same.

I claim:

1. In an expansion bolt, the combination of a pair of coacting shells, each of which is formed on its interior with a plurality of faces all of which are longitudinally inclined, an expansion member within said shells adapted when advanced against said inclined faces to force said shells apart, said shells and expansion member having no angle greater than a right angle to permit substantially the entire periphery of said member engaging constantly with the interior faces of the shells to apply expanding force thereagainst, and means for advancing said expanding member within the shells.

2. In an expansion bolt, a pair of coacting symmetrical shells each formed on its interior with two faces of substantially equal area at right angles to each other and longitudinally inclined from the inner end to the outer end thereof, each shell being longitudinally slotted for a major portion of its length at the angle thereof, a square nut received within said shells with its sides bearing constantly against all of said surfaces whereby the latter serve to guide and receive the bearing of said nut with the latter constantly engaging said surfaces, and the bolt engaging said nut to move the same longitudinally of the shells to radially expand the latter.

3. In an expansion bolt, a pair of co-acting shells, each being formed on its interior with two faces of substantially equal area at right angles to each other and longitudinally inclined from the inner end to the outer end thereof, the one shell being formed with bendable lugs and the other with depressions which said lugs overlie and engage to prevent lateral separation of said shells, a square nut within said shells and means engaging said nut for expanding said shells, said lugs being automatically releasable upon expansion of the shells.

JOSEPH R. CONRAD.

Witnesses:
 OLLIE HORTON,
 L. D. HAHN.